(12) United States Patent
Smith (10) Patent No.: US 6,204,849 B1
(45) Date of Patent: Mar. 20, 2001

(54) NON-AMBIGUOUS GRAPHICS SELECTION (75) Inventor: Gary Robert Smith, Commerce Township, MI (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/118,321

(22) Filed: Jul. 17, 1998

(51) Int. Cl.[7] ................................................. G06F 13/00
(52) U.S. Cl. ........................ 345/355; 345/357; 345/333; 345/348
(58) Field of Search .................................. 345/348, 333, 345/334, 339, 347, 357, 355, 145

(56) References Cited

U.S. PATENT DOCUMENTS

| | | | |
|---|---|---|---|
| 4,609,917 | * | 9/1986 | Shen ........................ 345/421 |
| 5,299,307 | * | 3/1994 | Young ...................... 345/339 |
| 5,461,709 | * | 10/1995 | Brown ..................... 345/355 |
| 5,892,512 | * | 4/1999 | Donnelly et al. ........ 345/349 |

FOREIGN PATENT DOCUMENTS

| | | | | |
|---|---|---|---|---|
| 318154A2 | * | 10/1988 | (EP) | .............................. 3/33 |
| 480570A2 | * | 8/1991 | (EP) | ............................ 15/72 |
| 0741352 | | 11/1996 | (EP) | . |

* cited by examiner

*Primary Examiner*—Raymond J. Bayerl
*Assistant Examiner*—Tadesse Hailu
(74) *Attorney, Agent, or Firm*—Gates & Cooper LLP (57) ABSTRACT

A method, apparatus, and article of manufacture are disclosed that provide an efficient and non-ambiguous differentiation and subsequent selection of a single virtual element displayed in close proximity with multiple other virtual elements on a two-dimensional graphics display. A large number of virtual element selection elements are possible at a single two-dimensional display location of a virtual three-dimensional space. The differentiation tool displays a large number of selection possibilities in a small screen size and substantially linear format such that rapid and non-ambiguous graphic selections are possible.

12 Claims, 9 Drawing Sheets

NON-AMBIGUOUS GRAPHICS SELECTION

BACKGROUND OF THE INVENTION

1. Field of the Invention

The present invention relates generally to graphical user interfaces, and in particular, to a method, apparatus, and article of manufacture for providing a non-ambiguous method for selecting graphical components in computer-aided design applications.

2. Description of the Related Art

The use of Computer Aided Design (CAD) application programs is well known in the art. Different approaches have been made with each successive generation of CAD modeling software to address the problem of selecting graphical elements (geometry or topology) from a two-dimensional representation of a complex three-dimensional scene. Early systems provided a mechanism that selected the closest graphical element to the cursor. Subsequent systems offered a linear, single-pass selection list with no means of previewing the multiple graphical element selections or to change the selection during the selection process. Newer systems have provided a mechanism that requires the user to recognize ambiguous graphical element selection scenarios prior to choosing the selection tool.

Other systems automatically provide the user with a device that allows the user to select graphical elements from a matrix displaying every possible graphical element selection. The user is free to traverse the matrix until the desired graphical element is located and a selection is made. While this device allows users to move freely amongst selection possibilities, it consumes valuable screen real estate, often occluding critical graphics.

Consequently, there is a need in the art for an improved interface to allow for selecting graphical elements from a two-dimensional representation of a complex three-dimensional scene. Further, there is a need in the art for an interface that allows for unambiguous graphical element selection that does not occupy large portions of screen real-estate.

SUMMARY OF THE INVENTION

To address the requirements described above, the present invention discloses a method, apparatus, and article of manufacture for selecting a single graphical element from a group of graphical elements that converge or overlap at a point on a two-dimensional scene representation. The selection tool uses icons to represent the graphical images, and highlights the graphical image that corresponds to each icon of the selection tool. To prevent large on-screen real estate usage, the selection tool uses well icons (icons that differ in appearance from the icons that represent the graphical images) to represent stacks of graphical elements that can be managed through mouse clicks, keyboard strokes, or Intellimouse™ wheel movement. By pushing and popping the stacks, the user can traverse the entire selection of graphical elements to select the desired graphical element for modification or deletion from the displayed file.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a computer-aided design (CAD) software tool that provides an efficient and non-ambiguous differentiation and subsequent selection tool to select a single graphical element displayed in close proximity with multiple other graphical elements on a two-dimensional graphics display. A large number of graphical elements are possible at a single two-dimensional display location of a virtual three-dimensional space. The differentiation tool displays a large number of selection possibilities in a small screen size and substantially linear format such that rapid and non-ambiguous graphical element selection is possible.

The present invention provides a selection tool that uses very little screen space, which allows the user to "see through" or "see around" the selection tool while still providing the free traversal (forward/backward) of the stacked selection options. Although the present invention is illustrated herein in a horizontal orientation, the present invention can be represented vertically or on a diagonal without departing from the scope of the present invention.

Hardware Environment

Figure 1:
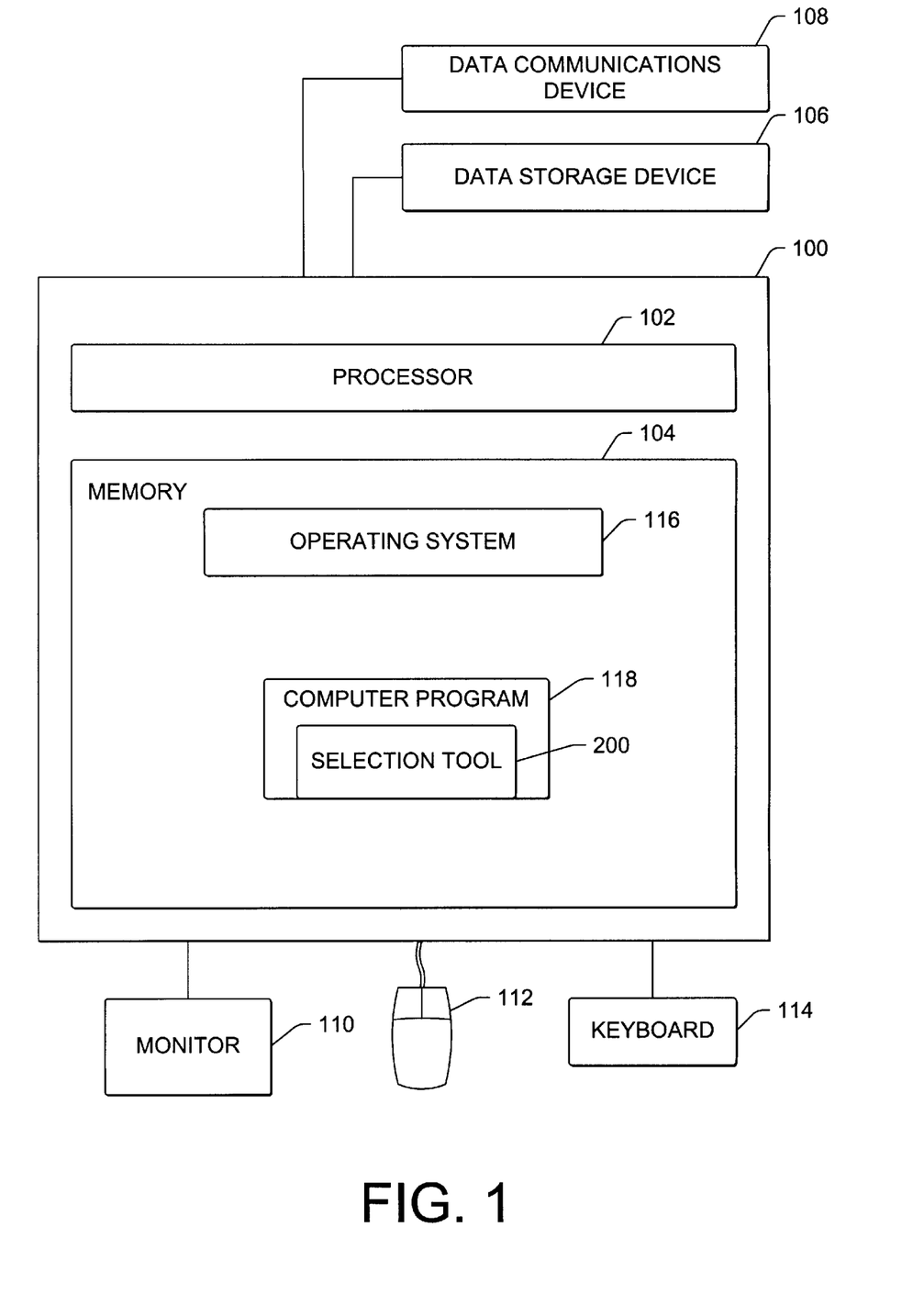
FIG. 1 is an exemplary hardware environment used to implement the preferred embodiment of the invention.

FIG. 1 is an exemplary hardware environment used to implement the preferred embodiment of the invention. The present invention is typically implemented using a personal computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, holographic display device, etc.), mouse pointing device 112 and keyboard 114. It is envisioned that attached to the personal computer 100 may be other devices such as read only memory (ROM), a video card, bus interface, printers, etc. Any combination of the above components, or any number of different components, peripherals, and other devices, may be used with the computer 100 without departing from the scope of the present invention. Further, the computer 100 can be a virtual-reality display device, that incorporates a holographic display device, goggles, or helmet in place of a monitor 110. For purposes of clarity, references herein to monitor 110 encompass and include additional references to all such holographic display devices, goggles, and helmets.

The personal computer 100 usually operates under the control of an operating system 116. The present invention is usually implemented in one or more computer programs 118 that operate under the control of the operating system 116. The computer program 118 is usually a CAD program or other graphics program. In the preferred embodiment, the computer program 118 provides one or more selection tools 200.

Generally, the computer program 118 and selection tool 200 comprise instructions and/or data that are embodied in or retrievable from a computer-readable device, medium, or carrier, e.g., the data storage device 106, a remote device coupled to the computer 100 via the data communications device 108, etc. Moreover, these instructions and/or data, when read, executed, and/or interpreted by the computer 100 cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Many modifications may be made to this configuration without departing from the scope of the present invention.

The present invention also teaches that any combination of the above components, or any number of different components, including computer programs, peripherals, and other devices, may be used to implement the present invention, so long as similar functions are performed thereby. The presentation of the computer system as described in FIG. 1 is not meant to limit the scope of the present invention, but to illustrate one possible embodiment of the present invention.

Functional Description

In an ambiguous graphical element selection situation, there are typically several graphical elements stacked in one location on a two-dimensional scene representation. In the present invention, when the cursor is placed on the intersection location of the scene, the graphical element on top (either the last graphical element placed in the scene, or the graphical element that has been placed closest to the front of the scene) highlights for selection by the user. If the user does not want to select this graphical element, after a user-defined programmable pause period, the selection tool 200 is displayed to assist the user in selecting the graphical element desired for deletion or modification purposes.

Figure 2A:
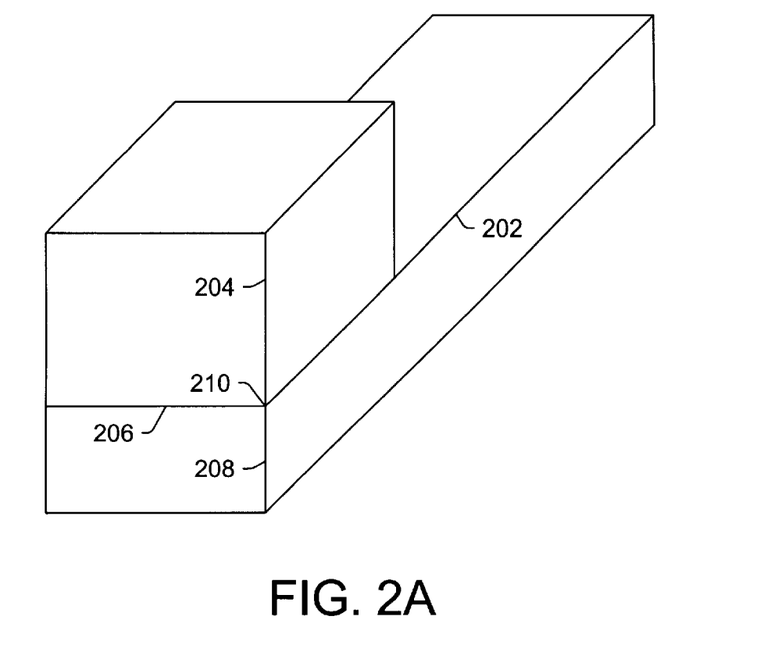
FIGS. 2A–2C illustrate the operation of the selection tool of the present invention.
Figure 2B:
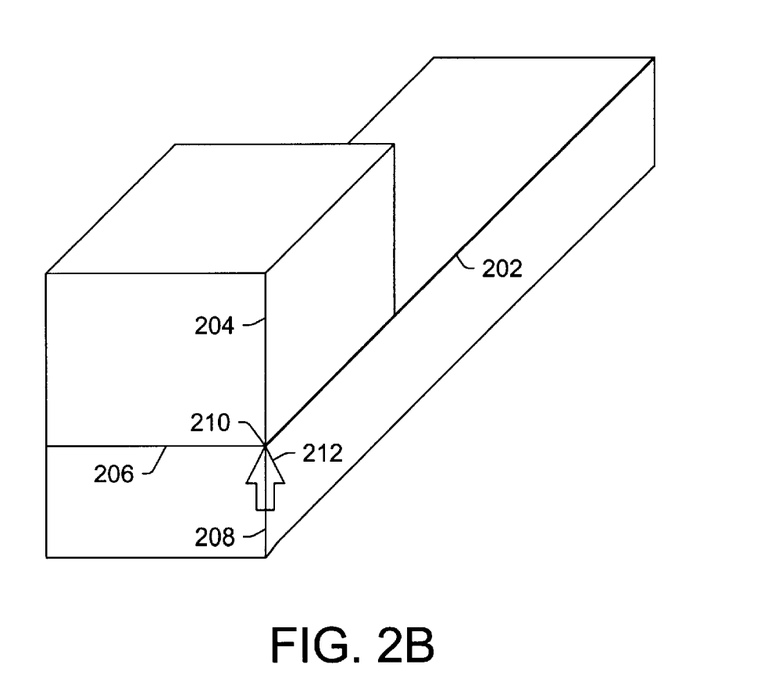
Figure 2C:
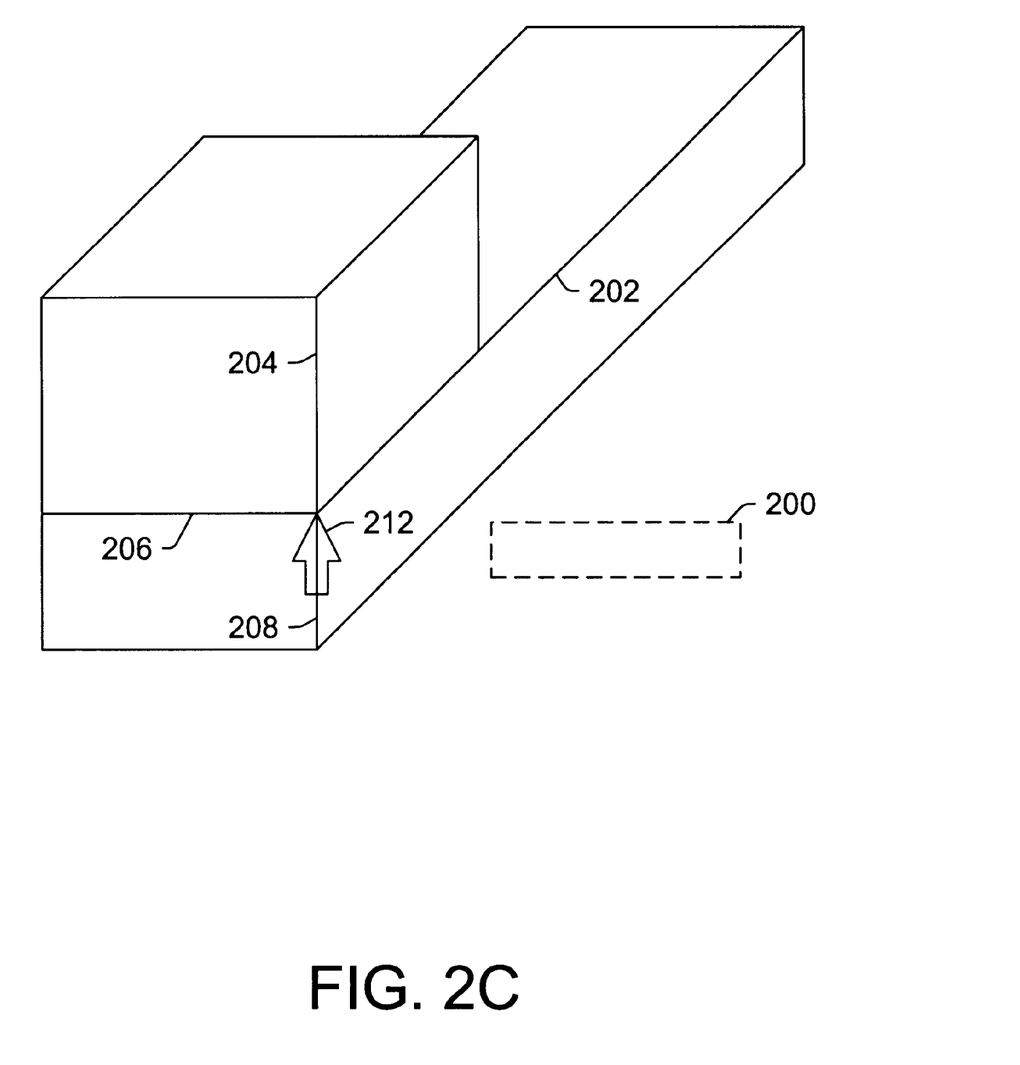

The selection tool of the present invention also incorporates well icons that push and pop stacks of additional graphical elements that intersect at a given point within a scene. As the user pushes and pops the stacked additional graphical elements, the present invention reassigns the additional graphical element to the icon so the user can select the additional graphical element for modification or deletion. FIGS. 2A–2C illustrate the operation of the selection tool 200 of the present invention.

FIG. 2A illustrates line 202, line 204, line 206, and line 208. Lines 202 and 204 are touching (stacked) with lines 206 and 208 at point 210. Although FIG. 2A illustrates lines, other graphical elements, such as virtual objects, objects used in virtual reality display systems, geometric constructs, part components of an assembly of parts, can be used with the present invention. When the cursor is placed at point 210, the computer program 118 is unsure as to which graphical element, i.e., line 202, line 204, line 206, or line 208 that the user wants to select for deletion or modification. Therefore, the computer program 118 typically selects the last graphical element entered, regardless of which graphical element the user wants to edit.

FIG. 2B illustrates the present invention when the cursor is placed at point 210. When the user places the cursor 212 on point 210, the uppermost graphics element is highlighted. For illustration purposes, line 202 is shown as highlighted in FIG. 2B to show that line 202 is the uppermost graphics element.

FIG. 2C illustrates the augmentation of the cursor with selection tool 200. If user does not wish to select the uppermost graphics element for modification or deletion, the user waits for a definable period of time, and the selection tool 200 is displayed on the monitor 112. Selection tool 200 can have different icons or gnomens within selection tool 200 as illustrated in FIGS. 3A–D. Although selection tool 200 is shown as a rectangular box, selection tool 200 can have any shape that allows for the display of icons, including being invisible to the user. Selection tool 200 is shown as a rectangular box for ease of illustration purposes only and is not meant to limit or otherwise affect the scope of the present invention.

FIGS. 3A–3D illustrate the display characteristics of the selection tool of the present invention.

Figure 3A:
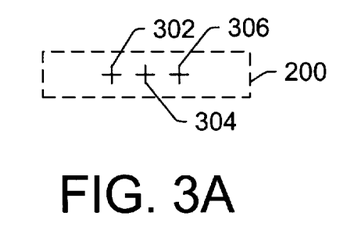
FIGS. 3A–3D illustrate the display characteristics of the selection tool of the present invention.

FIG. 3A illustrates an initial condition for the selection tool 200 of the present invention. FIG. 3A shows selection tool 200 containing first icon 302, second icon 304, and third icon 306. Each icon 302, 304, and 306 is represented by a plus sign, but other symbols can be used to represent each icon. Further, different symbols can be used for each icon 302, 304, and 306. Each icon 302, 304, and 306 represents one of the graphical elements (line 202, line 204, line 206 and line 208) that intersect at point 210. Once selection tool 200 appears, the user can use the cursor 212 to interact with the selection tool 200. As the user places the cursor 210 on one of the icons 302, 304, or 306, the icon highlights. At the same time as icon 302, 304, or 306 highlights, the graphical element that corresponds with the highlighted icon 302, 304, or 306 highlights as well, to indicate to the user which part would be selected for modification or deletion if the highlighted icon 302, 304, or 306 were selected with a mouse 112 click or keyboard 114 entry.

Additional items can be used in conjunction with icons 302, 304, and 306, such as bubble text or pop-up menus to further enhance the icons 302, 304, and 306.

If the intersection point 208 contained two graphical elements, correspondingly, only two icons 302 and 304 would appear within selection tool 200.

Figure 3B:
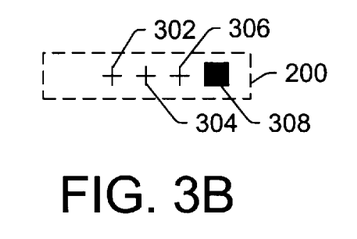

FIG. 3B illustrates an initial condition of the selection tool 200 of the present invention when more than three graphical objects are present at an intersection point 210. To indicate to the user that there are more than three graphical elements to choose from, well icon 308 is shown within selection tool 200. Well icon 308 is shown as a square, but can take other shapes without departing from the scope of the present invention.

Well icon 308 indicates that the user may have to scroll through more than three selections to find the desired graphical element at that intersection point 210. Well icon 308 can also take on other properties, such as color or flashing indicators, to indicate well conditions to the user. For example, well icon 308 is shown as a darkened square to indicate that additional graphical element choices exist for the user to choose from.

To scroll through the graphical elements, the user clicks the mouse 112 on the well icon 308, which then starts scrolling through the "stack" of graphical elements represented by the well icon 308.

Figure 3C:
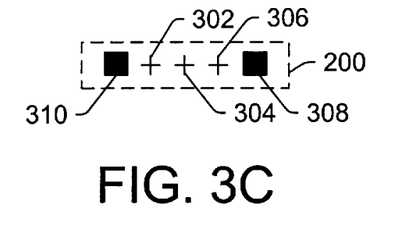

FIG. 3C illustrates the selection tool 200 of the present invention during use. As the user clicks on well icon 308, the stack of graphical elements represented by icons 302, 304, and 306 are pushed to well icon 310, and additional graphical elements are assigned to icons 302, 304, and 306. As the first graphical element represented by icon 302 is "pushed" to the point where the user can no longer select it with a single mouse 112 click, icon 302 goes into a separate stack of graphical elements. This separate stack is represented by well icon 310.

Initially, well icon 310 is empty. The empty condition of well icon 310 can be illustrated to the user in several ways. The well icon 310 can be null (i.e., not shown to the user) as in FIG. 3B. The well icon 310 can be shown as the same shape as well icon 308, but with a different color. As illustrated in FIG. 3C, well icon 308 is illustrated as full by showing a shape that is solid, and well icon 310 is illustrated as empty as being an open shape. Once an icon is pushed into the well icon 310, the well icon 310 appears and is visible to the user. As well icon 310 becomes full, e.g., has more than three graphical elements stacked within well icon 310, the well icon 310 can change appearance to illustrate this condition to the user.

Further, selection of the well icon 308 can pop more than one graphical element from the stack of graphical elements represented by well icon 308. For example, since the user has already determined that graphical elements represented by icons 302, 304, and 306 are not the graphical elements desired, selection of well icon 308 can assign three new graphical elements to icons 302, 304, and 306 for inspection by the user.

There are other methods for illustrating to the user that the well icons 308 and 310 are full, partially full, or empty. For example, colors can be used to indicate the relative number of icons in each well 308 and 310. Red can indicate that a well is full, green can indicate that a well is empty, and orange or yellow can indicate that a well is partially full or partially empty. The indication of full or empty for the well icons 308 and 310 are to indicate to the user the relative location of the three icons 302, 304, and 306 within the stack of icons that represent the graphical elements intersecting at point 208. Moreover, numbers or other textual materials can appear within, along side, or in conjunction with well icons 308 and 310 to indicate to the user how many additional graphical elements are represented by well icons 308 and 310.

Figure 3D:
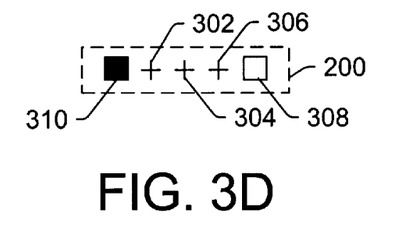

FIG. 3D illustrates the selection tool 200 of the present invention when the user has traversed the entire stack of icons. As the user clicks on the well icon 308, the graphical elements within well 308 are popped from the stack that well icon 308 represents and reassigned to one or more of the icons 302, 304, and 306. The graphical element that was represented by icon 302 is then pushed onto the stack that well icon 310 represents.

The present invention encompasses embodiments that would use a greater or lesser number of icons within the selection tool 200. Three plus sign icons 302, 304, and 306 are shown for ease of illustration and understanding only.

Example Using the Selection Tool

FIGS. 4A–4F illustrate an example using the selection tool of the present invention.

Figure 4A:
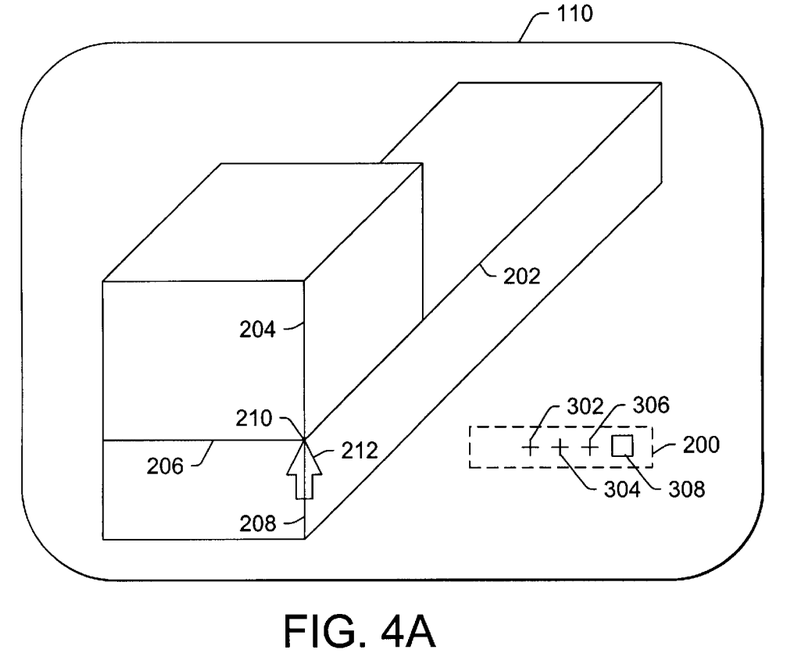
FIGS. 4A–4F illustrate an example using the selection tool of the present invention.

As shown in FIG. 4A, there are four graphical elements intersecting at point 210, e.g, lines 202, 204, 206, and 208 shown on the monitor 110. Once the user places the cursor at point 210, and waits for the user-defined period, selection tool 200 appears. Since there are more than three elements intersecting at point 210, selection tool 200 will appear containing icons 302, 304, 306 and well icon 308. In FIGS. 4A–4F, the appearance of selection tool 200 is enlarged for ease of illustration.

Figure 4B:
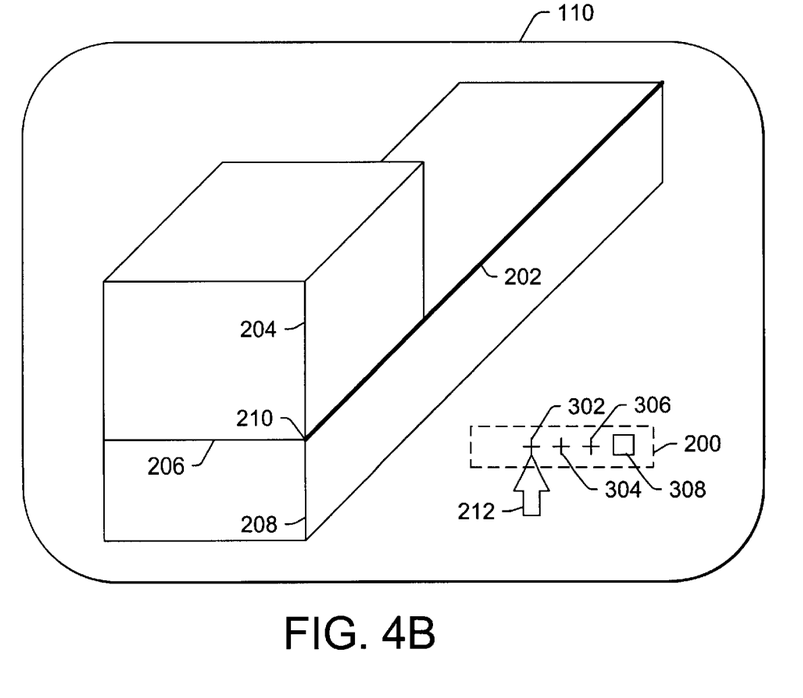

Once the selection tool 200 appears, the user is free to interact with the selection tool 200 with the cursor 212. As shown in FIG. 4B, once the cursor 212 is placed proximate to icon 302, a corresponding graphical element, which, in this case, is line 202, highlights on the monitor 112. The assignment of line 202 to icon 302 can be determined by the order of placement of the graphical elements into the file.

Figure 4C:
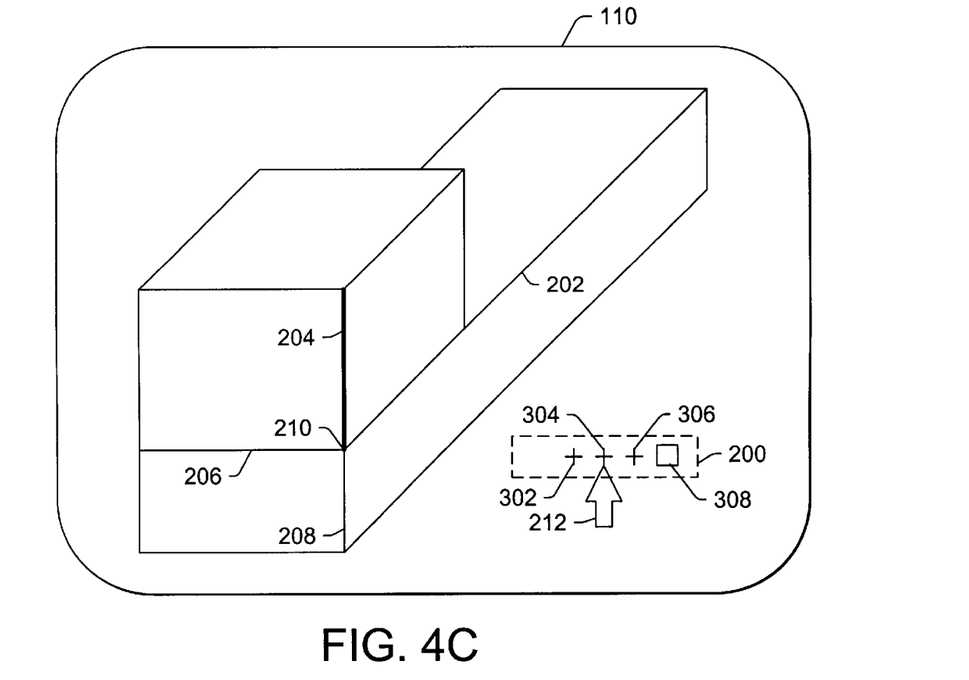

FIG. 4C illustrates selecting a different graphical element from the graphical elements that intersect at point 210. If the user does not want to modify line 202, the user moves the cursor 212 proximate to icon 304 on the selection tool 200. Line 202 is no longer highlighted, and line 204 highlights, indicating to the user that selection of icon 304 will select line 204 for modification or deletion.

Figure 4D:
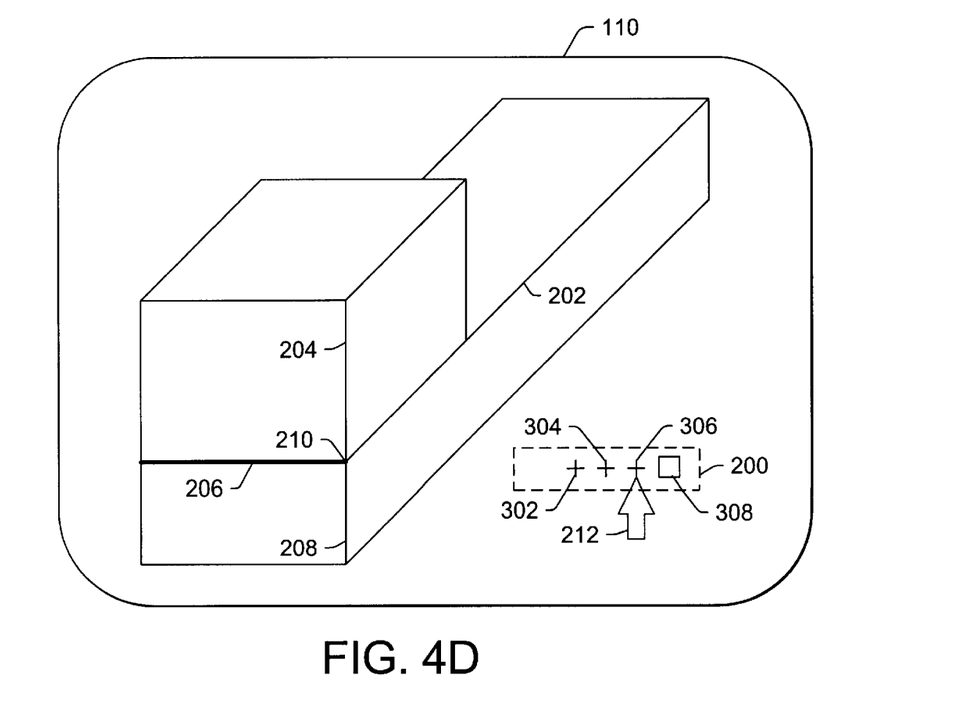

FIG. 4D illustrates selecting a different graphical element from the graphical elements that intersect at point 210. If the user does not want to modify line 204, the user moves the cursor 212 proximate to icon 306 on the selection tool 200. Line 204 is no longer highlighted, and line 206 highlights, indicating to the user that selection of icon 306 will select line 206 for modification or deletion.

Figure 4E:
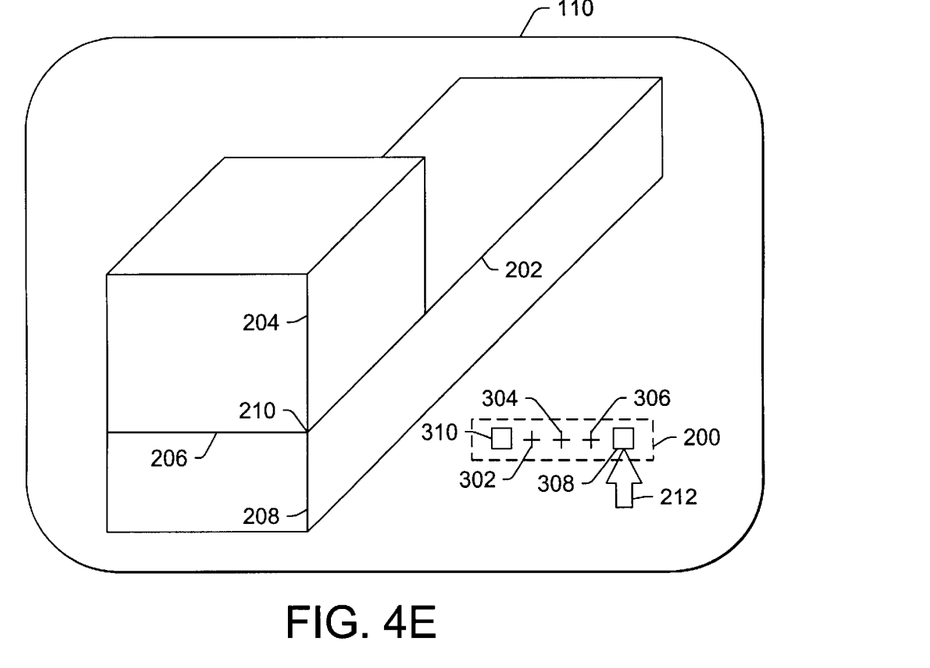

FIG. 4E illustrates using the well icon to select additional graphical elements that intersect at point 210. If the user does not want to modify lines 202, 204, or 206, the user moves the cursor 212 proximate to well icon 308 on the selection tool 200. Line 204 is no longer highlighted. The user selects or clicks on well icon 308 to reassign the graphical elements to the icons 302, 304, and 306. Because of this rearrangement, well icon 310 appears on selection tool 200.

Figure 4F:
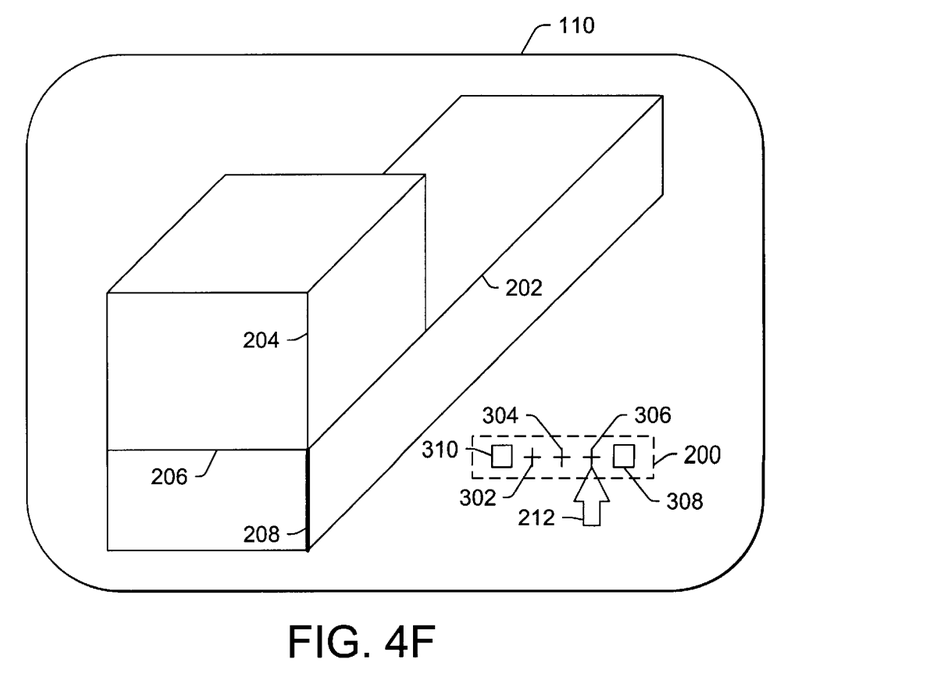

FIG. 4F illustrates selecting the additional graphical element from the graphical elements that intersect at point 210. Now that the user has reassigned the graphical elements to the icons 302, 304, and 306, the user can traverse icons 302, 304, and 306 to see if the desired additional graphical element will highlight when the cursor is placed on icon 302, 304, or 306. Now, when cursor 212 is placed on icon 306, the reassignment of graphical elements by the selection tool 200 highlights line 208, not line 206. This indicates to the user that selection of icon 306 will now select line 208 for modification or deletion.

FIGS. 4A–4F can be extended to include keyboard or Intellimouse™ interaction with the selection tool without departing from the scope of the present invention. Further, the appearance and location of selection tool 200 and the icons used therein are not meant to limit the scope of the present invention.

Logic of the Selection Tool

Figure 5:
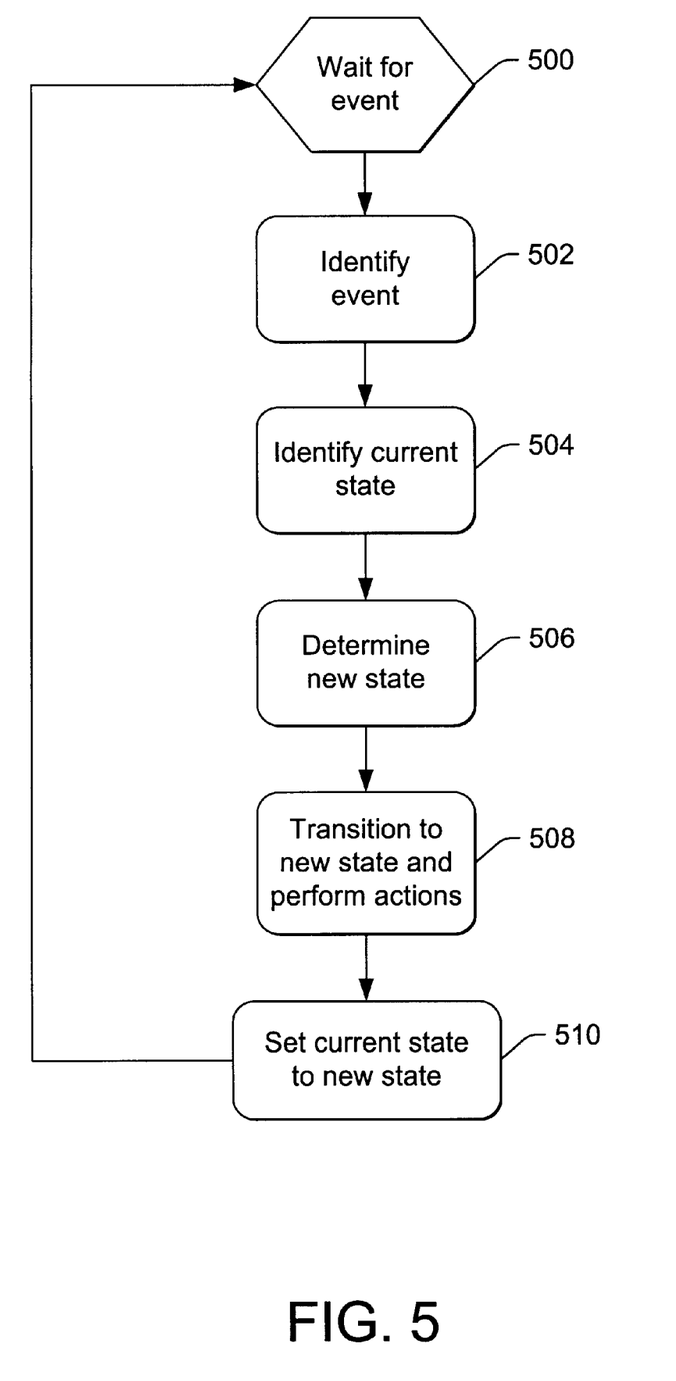
FIGS. 5 and 6 are flowcharts that illustrate the general logic of performing the steps of the present invention.
Figure 6:
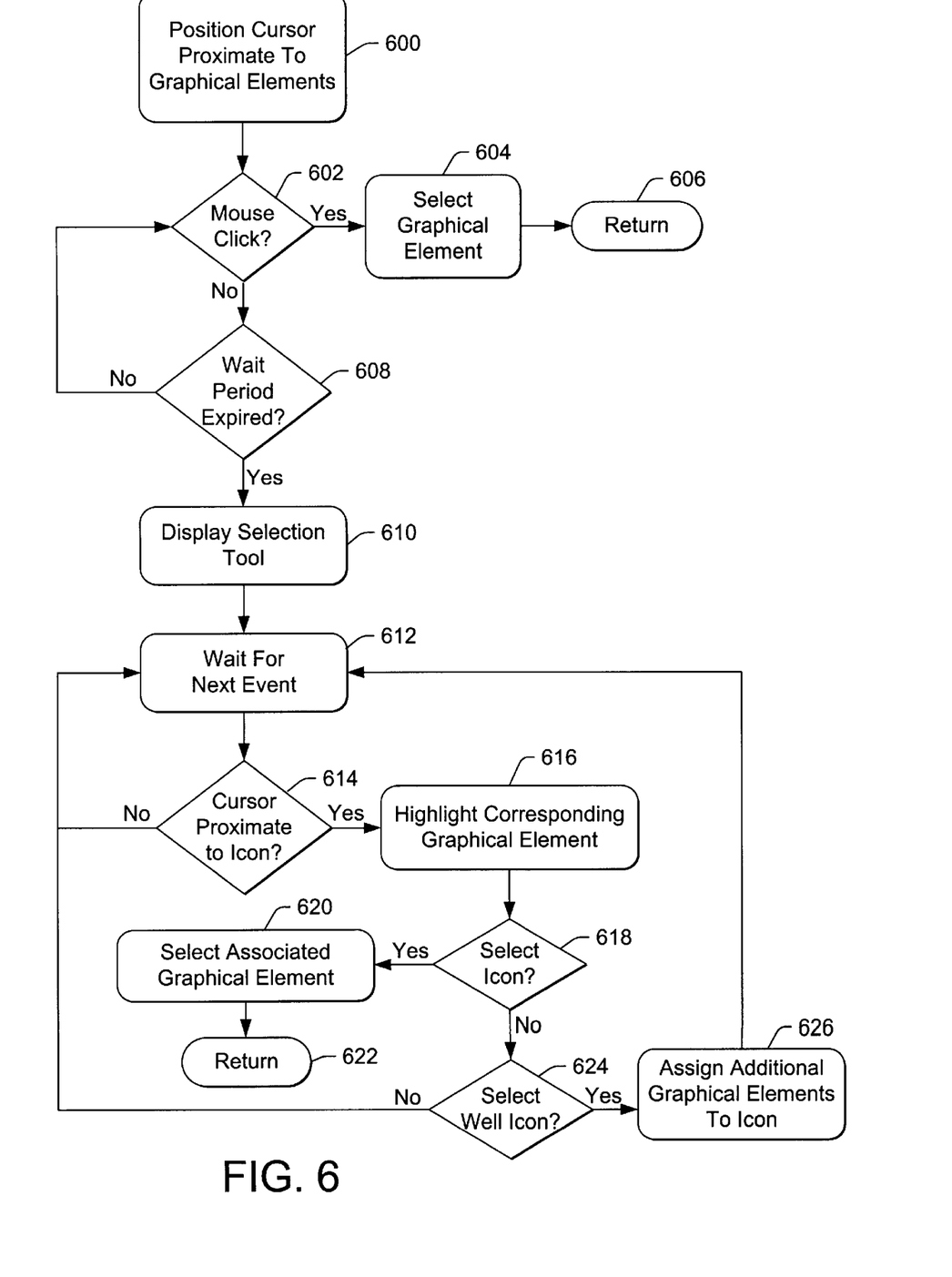

Flowcharts which illustrate the logic of the selection tool of the present invention are shown in FIGS. 5 and 6. This logic is provided for illustrative purposes only and that different logic may be used to accomplish the same results without departing from the scope of the present invention. The use of the selection tool with different computer programs 118 may result in different operations (or potentially the same operations).

FIG. 5 is a flowchart that illustrates the general logic of a message or event-driven computer 100 performing the steps of the present invention. In such a computer 100, operations are performed when transitions are made, based upon the receipt of messages or events, from present or current states to new states.

Generally, the flowchart begins by waiting at block 500 for an event (e.g., a mouse button click). It should be appreciated that during this time, other operating system 116 tasks, e.g., file, memory, and video tasks, etc., may also be carried out. When an event occurs, control passes to block 502 to identify the event. Based upon the event, as well as the current state of the system determined in block 504, a new state is determined in block 506. In block 508, the logic transitions to the new state and performs any actions required for the transition. In block 510, the current state is set to the previously determined new state, and control returns to block 500 to wait for more input events.

The specific operations that are performed by block 508 when transitioning between states will vary depending upon the current state and the event. The various operations required to implement and maintain the selection tool of the present invention represent particular events handled by the logic. However, it should be appreciated that these operations represent merely a subset of all of the events handled by the computer 100.

FIG. 6 is a flowchart that illustrates the general logic that is performed to determine whether to use the selection tool.

Block 600 illustrates the event of positioning a cursor 212 proximate to the graphical elements. Block 602 is a decision block that represents a mouse click or other event, e.g., a keyboard entry. If there is a mouse click, control passes to block 604, where the computer program 118 selects the graphical element for modification or deletion. Control then passes to block 606, where control is returned to block 500.

If there was no mouse click in decision block 602, control passes to decision block 608, where the wait period expiration is determined. If the programmable wait period has expired, control passes to block 610; otherwise, control returns to block 602.

Block 610 indicates that the computer program 118 is displaying the selection tool 200. Once the selection tool is displayed on the monitor 110, control passes to block 612, where the computer program 118 waits for additional events. Once an event occurs, control passes to decision block 614.

Block 614 is a decision block that determines whether the cursor 212 is placed proximate to one of the at least two icons displayed on the selection tool 200. If the cursor 212 is not placed proximate to the icon, control returns to block 612 to wait for additional events. If the cursor 212 is placed proximate to the icon, control passes to block 616, where the graphical element associated to the icon is highlighted when the cursor 212 is placed proximate to the icon. Control then passes to block 618.

Block 618 is a decision block that determines whether the icon has been selected by the user via a mouse click or a keyboard action. If the icon has been selected, control passes to block 620, where the computer program 118 selects the graphical element for modification or deletion. Control then passes to block 622, where control is returned to block 500.

If there was no mouse click in decision block 618, control passes to decision block 624, which determines whether the well icon 308 or 310 has been selected by the user via a mouse click or keyboard action. If the well icon 308 or 310 has been selected, control passes to block 626, where the additional graphical element is assigned to the icon. If the well icon 308 or 310 was not selected, control returns to block 612.

Conclusion

This concludes the description of the preferred embodiment of the invention. The following describes some alternative embodiments for accomplishing the present invention.

For example, any type of computer, such as a mainframe, minicomputer, workstation, personal computer, dedicated electronic game device, or hand-held electronic personal organizer could be used with the present invention. In addition, any software program, application, electronic game, or operating system having a user interface could benefit from the present invention.

Although the present invention is illustrated with lines, the present invention can be used with other geometrical and virtual objects. For example, virtual objects, which are best represented by lines on a two dimensional display, can also be selected using the selection tool of the present invention without departing from the scope of the present invention. Further, parts or assemblies comprising parts can be selected using the selection tool of the present invention.

The above teaching also supports additional functions that may also be implemented using the selection tool of the present invention. For example, an intelligent mouse 112 (Intellimouse™) wheel can be used to traverse the graphical elements instead of mouse 112 clicks.

In summary, the present invention discloses a method, apparatus, and article of manufacture for selecting a single graphical element from a group of graphical elements that converge or overlap at a point on a computer display. The selection tool uses icons to represent the graphical images, and highlights the graphical image that corresponds to each icon of the selection tool. To prevent large on-screen real estate usage, the selection tool uses icons to represent stacks of graphical elements that can be managed through mouse clicks or keyboard strokes. By pushing and popping the stacks, the user can traverse the entire selection of graphical elements to select the desired graphical element for modification or deletion from the computerized representation.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of selecting graphical images displayed on a display device attached to a computer, comprising:

displaying a selection tool on the display device;

displaying at least two icons within the selection tool, wherein the icons are assigned to corresponding graphical elements that are displayed in close proximity to each other on the display device;

displaying one or more well icons within the selection tool, wherein the well icon is assigned to at least one additional graphical element that is in close proximity to at least one of the other graphical elements;

reassigning the additional graphical element to one of the icons upon selection of the well icon;

highlighting the corresponding graphical element when a cursor is placed proximate to one of the icons within the selection tool; and selecting the highlighted graphical element when the icon is selected.

2. The method of claim 1, wherein displaying the selection tool occurs after a programmable amount of time.

3. The method of claim 1, wherein highlighting occurs when the cursor is spatially proximate to the icon.

4. The method of claim 1, wherein displaying the selection tool comprises placing a cursor proximate to an intersection point of at least two graphical elements.

5. A computer-implemented apparatus for selecting a graphical element, comprising:

a computer having a display device attached thereto;

a selection tool displayed on the display device;

at least two icons, displayed within the selection tool, the icons assigned to different graphical elements that are in close proximity to each other, wherein selection of the icon selects the corresponding graphical element; and one or more well icons, displayed within the selection tool, wherein each well icon is assigned to at least one additional graphical element that is in close proximity to at least one of the other graphical elements, and wherein the additional graphical element is reassigned to one of the icons upon selection of the well icon.

6. An article of manufacture comprising a computer program carrier readable by a computer and embodying one or more instructions executable by the computer to perform a method of displaying information on a display device attached to the computer, the method comprising:

displaying a selection tool on the display device;

displaying at least two icons within the selection tool, the icons assigned to corresponding graphical elements that are displayed in close proximity to each other on the display device;

displaying one or more well icons within the selection tool, wherein the well icon is assigned to at least one additional graphical element that is displayed in close proximity to at least one of the other graphical elements;

reassigning the additional graphical element to one of the icons upon selection of the well icon;

highlighting the corresponding graphical element when a cursor is placed proximate to one of the icons within the selection tool; and selecting the highlighted graphical element when the icon is selected.

7. The apparatus of claim 5, wherein the selection tool is displayed after a programmable amount of time.

8. The apparatus of claim 5, the corresponding graphical element is highlighted when the cursor is spatially proximate to the icon.

9. The apparatus of claim 5, wherein the selection tool is displayed when a cursor is proximate to an intersection point of at least two graphical elements.

10. The article of manufacture of claim 6, wherein displaying the selection tool occurs after a programmable amount of time.

11. The article of manufacture of claim 6, wherein the highlighting occurs when the cursor is spatially proximate to the icon.

12. The article of manufacture of claim 6, wherein displaying the selection tool comprises placing a cursor proximate to an intersection point of at least two graphical elements.

* * * * *